(12) United States Patent
Loth

(10) Patent No.: US 6,899,061 B1
(45) Date of Patent: May 31, 2005

(54) COMPRESSION IGNITION BY AIR INJECTION CYCLE AND ENGINE

(76) Inventor: John L. Loth, P.O. Box 4094, Morgantown, WV (US) 26504

(*) Notice: Subject to any disclaimer, the term of this patent is extended or adjusted under 35 U.S.C. 154(b) by 0 days.

(21) Appl. No.: 10/755,134

(22) Filed: Jan. 9, 2004

(51) Int. Cl.⁷ ............................................... F02B 11/00
(52) U.S. Cl. .................................. 123/27 R; 123/70 R
(58) Field of Search ........................... 123/27 R, 70 R, 123/317, 25 C

(56) References Cited

U.S. PATENT DOCUMENTS

| | | | |
|---|---|---|---|
| 1,904,775 A | * | 4/1933 | Bartholomew ................ 60/620 |
| 2,058,705 A | * | 10/1936 | Maniscalco ................... 123/72 |
| 3,623,463 A | * | 11/1971 | De Vries ................... 123/70 R |
| 3,675,630 A | * | 7/1972 | Stratton .................... 123/70 R |
| 3,774,581 A | * | 11/1973 | Lundy ....................... 123/70 R |
| 3,863,613 A | * | 2/1975 | Petrie ........................... 123/26 |
| 3,880,126 A | * | 4/1975 | Thurston et al. .......... 123/70 R |
| 4,314,539 A | | 2/1982 | Schade |
| 5,239,959 A | | 8/1993 | Loth |
| 5,309,713 A | | 5/1994 | Vassallo |
| 6,223,729 B1 | | 5/2001 | Matsuda et al. |
| 6,227,171 B1 | | 5/2001 | Matsuda |
| 6,338,328 B1 | * | 1/2002 | Mower et al. ............... 123/317 |
| 6,340,004 B1 | * | 1/2002 | Patton ....................... 123/25 C |
| 6,343,596 B1 | | 2/2002 | Hajji et al. |
| 6,640,773 B2 | | 11/2003 | Ancimer et al. |
| 6,651,432 B1 | | 11/2003 | Gray, Jr. |
| 6,662,760 B1 | | 12/2003 | Stanglmaier et al. |
| 6,666,185 B1 | | 12/2003 | Willi et al. |
| 6,789,514 B2 | * | 9/2004 | Suh et al. ................. 123/70 R |

FOREIGN PATENT DOCUMENTS

GB 1380941 1/1975

* cited by examiner

Primary Examiner—Henry C. Yuen
Assistant Examiner—Arnold Castro

(57) ABSTRACT

The herein disclosed Compression Ignition By Air Injection (CIBAI) cycle and internal combustion engine has following advantages over Otto and Diesel cycles: higher thermal efficiency and operating like a stratified charge engine on lean mixtures. More reliable by lack off: spark ignition, high-pressure fuel pump and injectors; throttle valve and cold starting problems. Only one valve is required in addition to the usual I.C. engine components. However the CIBAI cycle requires one or more pairs of piston/cylinders to operate together in phase. During the compression stroke a closed cylinder-connecting valve isolates the cylinders. One cylinder compresses an air-fuel mixture to below knock level. The other cylinder compresses only air to high pressure and temperature. Near top dead center, the cylinder-connecting valve opens allowing the high-pressure air to compress, heat and ignite the pre-evaporated air-fuel mixture. This valve remains open during following power stroke and scavenging of exhaust products.

18 Claims, 5 Drawing Sheets

US 6,899,061 B1

COMPRESSION IGNITION BY AIR INJECTION CYCLE AND ENGINE

FIELD OF THE INVENTION

This invention relates to a new thermodynamic cycle with associated engine geometry for increased fuel-efficiency, reliability and simplicity, relative to current engines based on Otto or Diesel cycle. The herein disclosed new thermodynamic cycle and engine geometry is referred to as Compression Ignition By Air Injection Cycle and Engine, abbreviated as "CIBAI" cycle and engine. Its thermodynamic efficiency has been shown to exceed that of both Otto and Diesel cycles over a wide range of operating conditions. The need for spark plugs, glow plugs, high-pressure cylinder fuel injectors and throttle valves has been eliminated thereby enhancing engine reliability. With the exception of an additional "cylinder-connecting valve" all components needed are standard for internal combustion engines.

BACKGROUND OF THE INVENTION

All currently operating internal combustion piston engines are based on either:
1) The Otto cycle which requires a near stoichiometric mixture at all power levels to achieve near constant volume combustion with spark ignition. To maintain such a mixture ratio at part power, the fresh air intake must be throttled. This lowers efficiency by power used for cylinder filling. Otto cycle efficiency is limited by compression ratio, fuel octane number and knock.
2) The Diesel cycle requires compressing air to high pressure and temperature such that when its fuel injectors spray fine droplets into the hot air, they quickly evaporate and burn. Good atomization requires a high-pressure fuel pump and fuel injectors. To complete combustion as fast as it takes to inject the fuel (called cut-off ratio), a high cetane number fuel is required. The combustion process takes place during piston expansion, which results in the Diesel cycle having constant pressure heat addition. This is less efficient than constant volume heat addition as is possible when igniting a pre-evaporated air-fuel mixture, as in the Otto cycle. At full power, the cut-off ratio increases, which reduces efficiency and presents the possibility of incomplete combustion and air pollution by unburned hydrocarbons leaving the exhaust pipe. Small diesel engines for lawnmowers, chainsaws etc. do not exist because high-pressure fuel injectors cannot dispense small quantities of fuel. At cold temperatures the diesel fuel does not atomize nor evaporate well, and has a tendency to gel which explains its cold starting problems. The diesel engine is usually more efficient than a spark ignition engine and diesel fuel tax is less than gasoline tax. The lubricating property of Diesel fuel reduces cylinder wall wear, unlike gasoline, which dissolves the oil film from the walls. This makes the Diesel engines last longer than gasoline engines. Therefore the diesel engine is preferred for long distance hauling. Note: service problems are mostly related to their fuel-injector systems.

In the automotive, general aviation and small engines industry, reciprocating piston engines are mostly used because of their efficiency and high power to weight ratio. Spark ignition engines based on the Otto cycle are currently the lightest and the least expensive. Their thermal efficiency increases with design volumetric compression ratio ($r_v$), which ranges from 7 to 11 and requires a corresponding increase in fuel-octane number from 80 to 100, to prevent pre-ignition and knock, and therefore fuel cost. Very high compression ratio fuel-efficient spark ignition engines are used in general aviation aircraft because their fuel weight is limited, therefore aircraft range and endurance depend on high fuel efficiency. At most airports only 100 octane Low Lead avgas and jet fuel are made available. For years the FAA has been trying to discontinue providing poisonous 100 Low Lead avgas by replacing such engines with a low cost, low maintenance, light weight, efficient diesel engine operating on jet fuel. Up till now this has not yet materialized. However the CIBAI engine might be a viable substitute as it can be operated efficiently on a wide range of liquid and gaseous fuels!

To extend the life of our hydro-carbon fuel reserves and minimize the atmospheric carbon-dioxide buildup there is a need for engines to operate on the CIBAI cycle to: accept a wide range of fuels, be more fuel efficient, reduce air pollution by unburned hydrocarbons, eliminate maintenance intensive components such as spark ignition systems and high-pressure fuel injectors, increase the range of general aviation aircraft and eliminate the need for poisonous 100 Low Lead avgas.

SUMMARY OF THE INVENTION

This invention relates to the design of a new thermodynamic cycle and associated engine layout for increased fuel-efficiency and reliability relative to current engines based on either the Otto or Diesel cycle. The herein disclosed Compression Ignition By Air Injection Cycle and Engine is hereafter referred to as the CIBAI cycle or engine. The thermodynamic equation for its efficiency has been shown to exceed that of both the Otto and Diesel cycles over a wide range of operating conditions. The CIBAI cycle eliminates the need for spark/glow plugs or high-pressure cylinder fuel injectors, thereby enhancing its reliability. With the exception of an additional "cylinder-connecting valve" all other components used are standard for I.C. engines. Described herein are the Compression Ignition By Air Injection (CIBAI) Cycle and Engine. The engine comprises conventional piston engine components such as: crankshaft in a casing, cylinders, pistons, carburetor or low pressure inlet manifold injection and the in case of 4-stroke engines cylinder head valves while for 2 stroke engines cylinder wall ports with crank-case compression. To enable operation on the CIBAI cycle the engine must have pairs of cylinders with pistons operating in phase with their cylinder heads in close proximity. For a single crankshaft configuration, each cylinder pair is mounted side-by-side inline with the crankshaft. If two crankshafts are used, then cylinders can be mounted head to head or in a V formation. One of the cylinders in each pair is used to compress an air-fuel mixture, with a volumetric compression ratio $r_{vaf}$, just short of knock level. The other cylinder compresses only air to high pressure and temperature with volumetric compression ratio $r_{va}$. One additional item is required: the cylinder connecting valve which upon opening should not alter the combined volume of the air-fuel mixture and hot air volume. This cylinder-connecting valve remains closed during most of the compression stroke, but opens near Top Dead Center. At that instant nearly all of the hot high-pressure air expands into the cylinder with the air-fuel mixture. The sudden compression and heating of the pre-evaporated air-fuel mixture causes spontaneous ignition near Top Dead Center. The combustion pressure rise transfers some of the combustion products back into the air-compressing cylinder. By the end of the expansion stroke each cylinder contains nearly the same amount of combustion products. The sudden rise in air-fuel mixture pressure just prior to ignition gives the CIBAI cycle a higher effective compression ratio than the Otto cycle. The CIBAI cycle constant volume heat addition renders it also more efficient than constant pressure burning Diesel cycles over most commonly used compression ratios. A comparison of ideal cycle efficiencies for the CIBAI-Otto- and Diesel cycles has been shown here assuming both pistons used in the CIBAI cylinder pair have the same displacement volume $V_o$. The following efficiency controlling parameters have been kept equal for comparison purposes:

1) Polytropic compression and expansion coefficient n (used in: p $V^n$=constant)
2) Air-fuel mixture piston volumetric compression ratio $$r_{vaf} = \frac{V_o + V_{2af}}{V_{2af}}$$

3) Air-only piston volumetric compression ratio $$r_{va} = \frac{V_o + V_{2a}}{V_{2a}}$$

4) Combustion induced temperature ratio $T_3/T_2=r_c$, called cut-off ratio in the diesel cycle.

The cycle efficiency of the three above-mentioned ideal cycles is shown below in closed form. For the spark-ignition Otto cycle find:

$$\eta_{th\ Otto} = \frac{Q_{in} - Q_{out}}{Q_{in}} = 1 - \frac{1}{r_v^{n-1}}$$

For the compression ignition Diesel cycle find:

$$\eta_{th\ Diesel} = \frac{Q_{in} - Q_{out}}{Q_{in}} = 1 - \left(\frac{1}{r_v^{n-1}}\right)\left(\frac{r_c^n - 1}{n(r_c - 1)}\right)$$

For the compression ignition CIBAI cycle find the air to air-fuel mixture mass ratio to be:

$$r_m = \frac{r_{va}/(r_{va} - 1)}{r_{vaf}/(r_{vaf} - 1)}.$$

This mass ratio is needed together with the volume ratio of the combined two cylinder compression volume, $V_2$, divided by the displacement volume, $V_o$, of the air-fuel piston:

$$\frac{V_2}{V_o} = \frac{1}{(r_{vaf} - 1)} + \frac{1}{(r_{va} - 1)}.$$

Inserted below gives the CIBAI cycle efficiency as:

$$\eta_{th\ CIBAI} = \left[\frac{W_{out}}{Q_{in}} = \frac{r_c*(1 - ((V_2/V_o)/(V_2/V_o + 2))^{(n-1)})}{(r_c - 1)}\right] - \left[\frac{W_{in}}{Q_{in}} = \frac{r_{vaf}^{(n-1)} - 1 + (r_{va}^{(n-1)} - 1)*r_m}{(r_{vaf}^{(n-1)} + r_{va}^{(n-1)}*r_m)*(r_c - 1)}\right]$$

List of differences between these three cycles

Hot air injection with CIBAI near Top Dead Center causes instant air-fuel compression, heating and turbulent mixing, resulting in ignition and combustion at constant volume, while preventing knock. Spark ignition engine (Otto cycle) compresses the air-fuel mixture gradually and therefore knock if the compression ratio is too high prior to spark ignition Because the air-fuel mixture is in general rich as it contains only about half the combustion airhot-high-pressure air can ignite even lean mixtures, there is no need for a throttle valve to reduce airflow at low power to maintain a spark ignitable mixture in the CIBAI engine.

Two-stroke spark ignition (Otto cycle) engine efficiency is limited by its ability to scavenge all combustion products without loss of unburned fuel through the exhaust port. The CIBAI cycle scavenges combustion products only in one direction to the exhaust ports, first using air followed by an air-fuel mixture from the respective crankcases of the air and air-fuel cylinders. Thus scavenging can be thorough without loss of fuel through the exhaust port.

Otto cycle two-stroke spark ignition engine performance is poor at high altitude due to difficulty in maintaining a near stoichiometric mixture. As the CIBAI cycle engines are not sensitive to mixture ratio their altitude performance is good.

Spark ignition (Otto cycle) engine's maintenance problems associated with spark plug fouling and high voltage ignition are avoided with CIBAI cycle's hot air ignition.

Maintenance problems with direct cylinder fuel injectors in spark ignition (Otto cycle) stratified-charge engines are avoided CIBAI cycle.

Diesel engine's maintenance problems associated with a high-pressure fuel pump and individual cylinder fuel injectors are avoided in CIBAI cycle's ignition by hot air.

Diesel engine's fuel injection problems under high load resulting in incomplete combusted hydrocarbons and soot in the exhaust are avoided in CIBAI cycle's ignition by hot air.

Diesel engine's need for heavy construction for high compression ratio and efficiency is not needed with the CIBAI cycle because of its reduced sensitivity to high $r_{va}$.

The inability of Diesel engine's fuel injectors to accurately meter small fuel quantities eliminates their application to the small engine market: lawnmowers, UAV's, etc. The simplicity and reliability of the CIBAI cycle makes it ideal for small engine operation.

Igniting a pre-evaporated air-fuel mixture with an engine operating on the CIBAI cycle eliminates the Diesel's engine's cold day starting problems, with its reduced fuel injector atomization with increased fuel viscosity and associated slower vaporization and ignition.

The increased efficiency of a CIBAI cycle engine can extend life of our fossil fuel reserves and reduce automotive exhaust air-pollution and carbon dioxide emissions.

The CIBAI cycle engine can tolerate a wide range of cheaper and safer fuels, eliminating the need for a high octane fuels or high lubricity to minimize Diesel fuel-injector wear and high cetane number to promote rapid combustion.

A gradual replacement of Otto and Diesel cycle engines with CIBAI cycle engines will not stress existing fuel supply network as would replacing with hydrogen fueled cars.

Some existing aircraft and automotive piston engines maybe retrofitted to CIBAI cycle operation for increased efficiency and reliability while using more economical jet fuel.

Changing general aviation aircraft piston engines to operation on the CIBAI cycle increases reliability and efficiency and does not introduce new technology which would require FAA certification.

Converting all 100 Low Lead requiring engines to operate on the CIBAI cycle will solve the poisonous 100 Low-Lead avgas problem.

BRIEF DESCRIPTION OF THE DRAWINGS

All but one part needed are standard I.C. engine components. Their unique arrangement has been shown in FIGS. 1, 2 and 3 schematic format for clarity rather then perspective or isometric views. Four-stroke engines with an even number of cylinders in line might be converted to operate on the CIBAI cycle. This would require a new crankshaft so that each adjacent pair of cylinders reaches Top Dead Center at the same time. Next the cylinder head must be changed for two reasons. a) A cylinder-connecting valve between each pair of cylinders must be added which stays open during the expansion and scavenging strokes but closes during the intake and compression strokes. b) Half of the inlet and exhaust manifolds openings must be blocked off. The compression ratio in the air-fuel cylinders must be selected based on fuel used. Spark ignition, throttle valve and high-pressure fuel pump plus cylinder injectors will not be needed.

DETAILED DESCRIPTION OF THE PREFERRED EMBODIMENT

To operate a piston internal combustion engine on the Compression Ignition By Air Injection (CIBAI) cycle requires at least one pair of pistons operating in phase, with their heads near one another. One of the pistons compresses an air-fuel mixture to a pressure ratio limited by knock as in spark ignition engines. The other piston compresses air to high-pressure. When both pistons reach near Top-Dead-Center, a cylinder-connecting valve opens without increasing the combined compression volumes. Most of the hot high-pressure air transfers into the air-fuel mixture, causing sudden compression and heating followed by explosive combustion at near constant volume. This combustion pressure rise drives some of the combustion products back into the air cylinder. During the subsequent expansion stroke the cylinder-connecting valve is kept open to keep the pressure the same on both pistons. At Bottom Dead Center both cylinders will contain approximately the same amount of combustion products. CIBAI cycle operation eliminates the need for spark plugs with their required high voltage source and eliminates the need for a high-pressure fuel pump with its fuel injectors. The CIBAI cycle thermal efficiency exceeds that of the Otto cycle due to increased pressure prior to ignition and exceeds that of the Diesel cycle because combustion takes place at constant volume instead of at constant pressure till the cut-off ratio is reached. The additional needed component is the cylinder-connecting valve, which can be actuated either by mechanical, hydraulic or electric valve actuators (lifters) or by pneumatic pressure differences.

Figure 1:
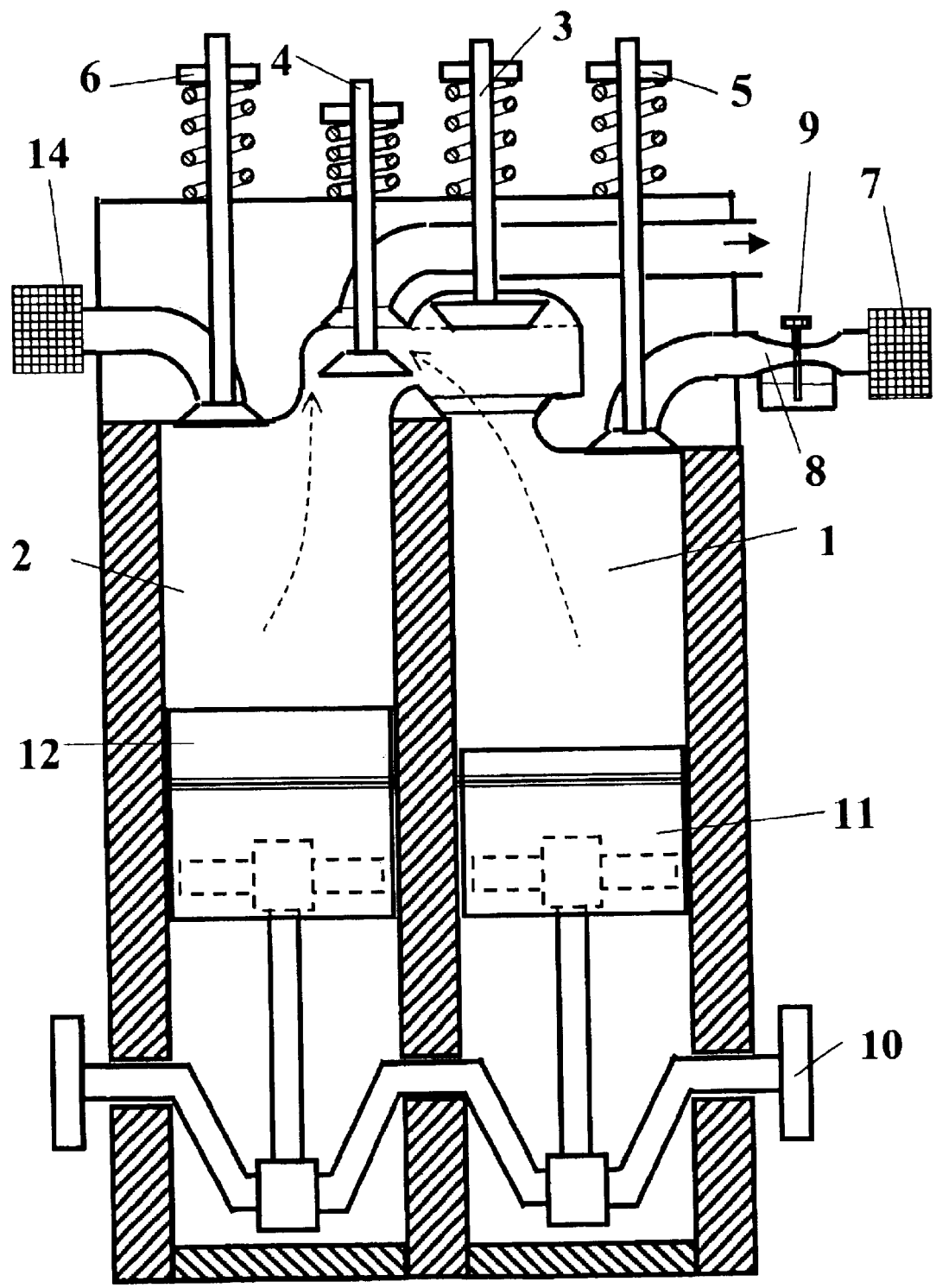
FIG. 1 is a schematic drawing of a pair of piston/cylinders, operating side-by-side on the CIBAI cycle in a 4-stroke engine. The right cylinder compresses an air-fuel mixture while the left cylinder compresses air to high pressure and temperature. Conventional cylinder head valves are used here for both air and air-fuel intakes as well as exhaust and cylinder-connecting valve. Other optional cylinder-connecting valve geometries are shown in FIGS. 2 and 3. These valves are actuated by: mechanical, hydraulic, electric or pneumatic means.

FIG. 1 is a schematic drawing of a pair of piston/cylinders, operating side-by-side in phase on the CIBAI cycle in a 4-stroke engine. The right cylinder compresses an air-fuel mixture while the left cylinder compresses air to high pressure and temperature. Conventional type cylinder head valves are used here for both air and air-fuel intakes as well as exhaust and the cylinder-connecting valve. Shown here is the start of the scavenging stroke. The cylinder-connecting valve 3 is wide open and shown out of the way in the retracted position. The dashed arrows show the direction of flow of exhaust gas from cylinders 1 and 2 and out of the one or more open exhaust valves 4. At the end of the scavenging stroke both the exhaust valve 4 and the cylinder-connecting valve 3 are closed. During the intake stroke an air-fuel mixture is generated in carburetor 8 with air from filter 7 and enters through inlet valve 5 into cylinder 1. At full power, the fuel-air mixture ratio in cylinder 1 may have to be up to twice as rich as in an Otto cycle because it is going to be diluted when hot air is injected from cylinder 2. Engine power is adjusted by fuel flow control with needle 9. Air enters through filter 14 and inlet valve 6 into cylinder 2. During the compression stroke the cylinder-connecting valve 3 remains closed. Near Top Dead Center a mechanical, hydraulic or electric valve lifter is used to open the cylinder-connecting valve 3. This allows the high pressure and temperature air inside cylinder 2 to compress, heat and ignite the pre-evaporated air-fuel mixture in cylinder 1. During combustion the pressure in cylinder 1 rises to exceed that in cylinder 2, which causes flow reversal and ignition of any unburned fuel present in cylinder 2. Cylinder-connecting valve 3 remains open till the end of the expansion stroke to equalize the pressure in both cylinders. Near bottom dead center exhaust valve 4 opens and the sequence repeats itself. Power is extracted from crankshaft 10 which can support several pairs of pistons in a row. Note piston 11 is shorter than piston 12 because the compression ratio in cylinder 1 is lower.

Figure 2:
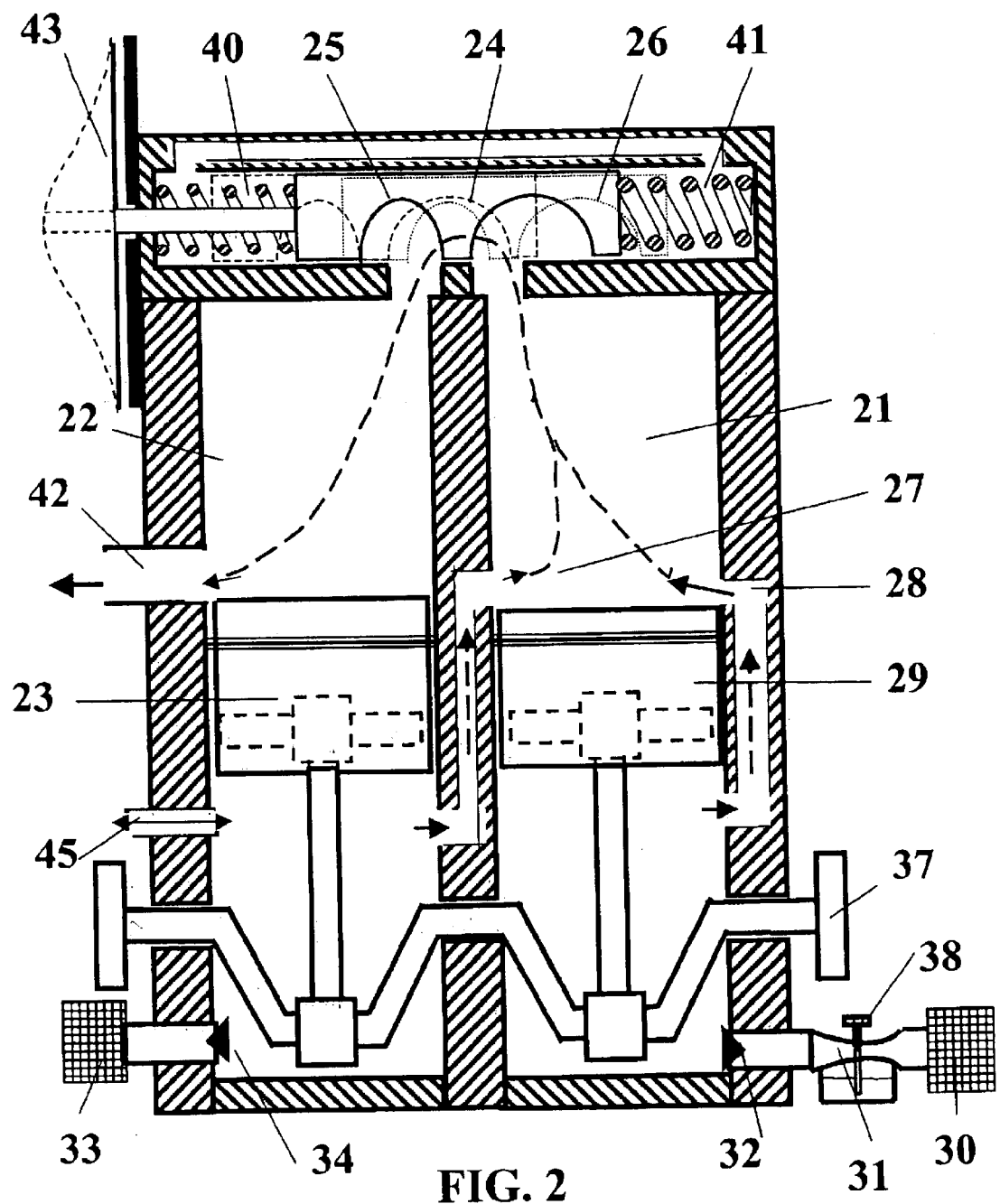
FIG. 2 is a schematic drawing of a pair of piston/cylinders, operating side-by-side on the CIBAI cycle in a 2-stroke engine. The right cylinder crankcase compresses an air-fuel mixture while the left cylinder crankcase compresses air to high pressure and temperature. During scavenging, air and air-fuel mixture enter through the right cylinder wall ports and push combustion products out of the left cylinder exhaust port while the cylinder-connecting valve stays open. The cylindrical shaped cylinder-connecting valve shown here is actuated pneumatically using available internal pressure differences. This valve can also be actuated by mechanical, hydraulic or electric means.

FIG. 2 is a schematic drawing of a pair of piston/ cylinders, operating side-by-side in phase on the CIBAI cycle in a 2-stroke engine. The right cylinder 21 is used to compress an air-fuel mixture while the left cylinder 22 is used to compress air to high pressure and temperature. Shown here are the pistons at Bottom Dead Center with the dashed arrows showing scavenging of combustion products out of exhaust port 42, first by means of crankcase pressurized air from port 27 and followed by the air-fuel mixture from port 28. Note during scavenging the cylinder-connecting valve is in the open position, "see dashed outline" 24. The cylindrical-connecting valve used here is actuated pneumatically using internal pressure differences. During the compression stroke springs 40 and 41 on either side of the valve are used to hold it closed in position, "see solid outline" 25. Near Top Dead Center the pressure in cylinder 22 becomes sufficiently higher than in cylinder 21 to push the valve open against spring 41. With the help of spring 40 the valve moves to position "see dotted outline" 26. Then hot high-pressure from cylinder 22 enters cylinder 21, compressing, heating and igniting the air-fuel mixture. The resulting combustion pressure rise in cylinder 21 moves the valve back to the normally open position 24, where during the expansion power stroke it is kept open by the pressure buildup on diaphragm 43, connected to crankcase opening 45. As piston 23 nears Bottom Dead Center, exhaust port 42 is cleared by piston 23. This allows combustion products to expand and escape from both cylinders. Next, air-inlet port 27 is cleared by piston 29 and air under pressure from crankcase of cylinder 22 rushes into cylinder 21 while scavenging more exhaust products out of port 42. Scavenging continues when port 28 opens up, which allows cylinder 21 to fill up with an air-fuel mixture and push the air charge ahead of it into cylinder 22. This clears out the remaining products of combustion. Even if a small amount of fuel carries over into cylinder 22, the resulting mixture will be too lean to be auto ignitable, so that its combustion will not take place until the cylinder-connecting valve is pushed open near Top Dead Center and the process repeats itself. Power is extracted from crankshaft 37 which can support several pairs of pistons in a row. Piston 29 is shorter than piston 23 because the compression ratio in cylinder 21 is lower. More precise timing of the cylinder-connecting valve opening and closing can be obtained by conventional valve lifters or other mechanical, hydraulic, electric or pneumatic means.

Figure 3:
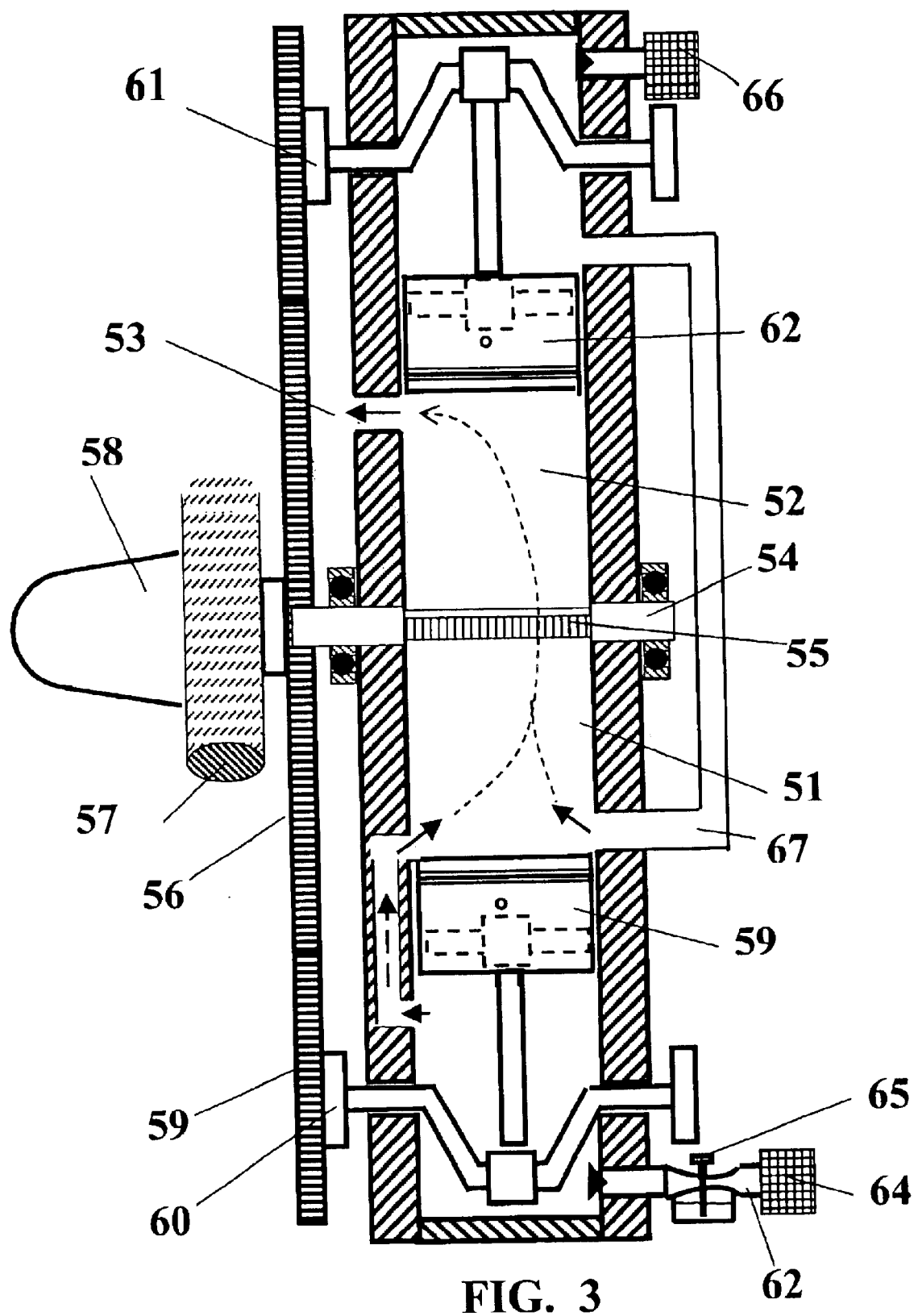
FIG. 3 is a schematic drawing of a pair of piston/cylinders, operating head to head on the CIBAI cycle in a 2-stroke engine mounted end-to-end to maximize engine balance. Scavenging is done by air and air-fuel discharging through ports in the lower cylinder pushing out exhaust products through ports in the upper cylinder. The cylinder-connecting valve is closed during the compression stroke. The bottom cylinder compresses an air-fuel mixture while the upper cylinder compresses only air. Near Top Dead Center the cylinder-connecting valve is opened to induce ignition followed the expansion stroke. The cylinder-connecting valve shown here is in the form of a rotating shaft, milled down in the middle to form into a rectangular butterfly like valve and rotating at half the rpm of the two crankshafts. The two crankshafts use 2:1 reduction gearing or chain to drive the power output shaft which also contains the cylinder connecting valve.

FIG. 3 shows a schematic of a 2-stroke engine with a pair of cylinders mounted end-to-end for optimum mass balance with pistons moving in phase. The two intake- and one exhaust valve shown in FIG. 1 are here in the form of cylinder wall ports opened by the lower piston at near Bottom Dead Center. The cylinder-connecting valve is shown as an integral part of the rotating drive shaft 54, which has been milled down to a bar shape 55 to serve as a rectangular butterfly type valve. The central driveshaft 54 also serves to extract power via a 2:1 reduction gearing or chain drive from the two separate crankshafts 60 and 61. Note the use of a 2:1 reduction gear ratio is essential as the cylinder-connecting valve opens twice per revolution. The application shown here is for a small airplane engine where a propeller 57, with spinner 58, is shown mounted directly on driveshaft 54. Piston 59 in cylinder 51 is shown at Bottom Dead Center position where cylinder 51 first fills up with compressed air from the crankcase of cylinder 52 via external pipe 67 while expelling exhaust products through port 53. Next, it fills with a compressed air-fuel mixture from the crankcase of cylinder 51. This scavenges all remaining combustion products from cylinders 52 and out of exhaust port 53. Note as soon as scavenging is completed the cylinder-connecting valve 55 is closed during the remainder of the compression stroke. At or near Top Dead Center the cylinder connecting valve 55 is opened and hot high-pressure air flows from cylinder 52 into 51 and compression ignition occurs. The cylinder-connecting valve remains open till Bottom Dead Center where the cycle repeats itself. Note during the compression stroke, crankcase of cylinder 51 fills with an air-fuel mixture through filter 64 and carburetor 62 with fuel flow control by valve 65, and crankcase of cylinder 52 fills with an air through filter 66.

Figure 4A:
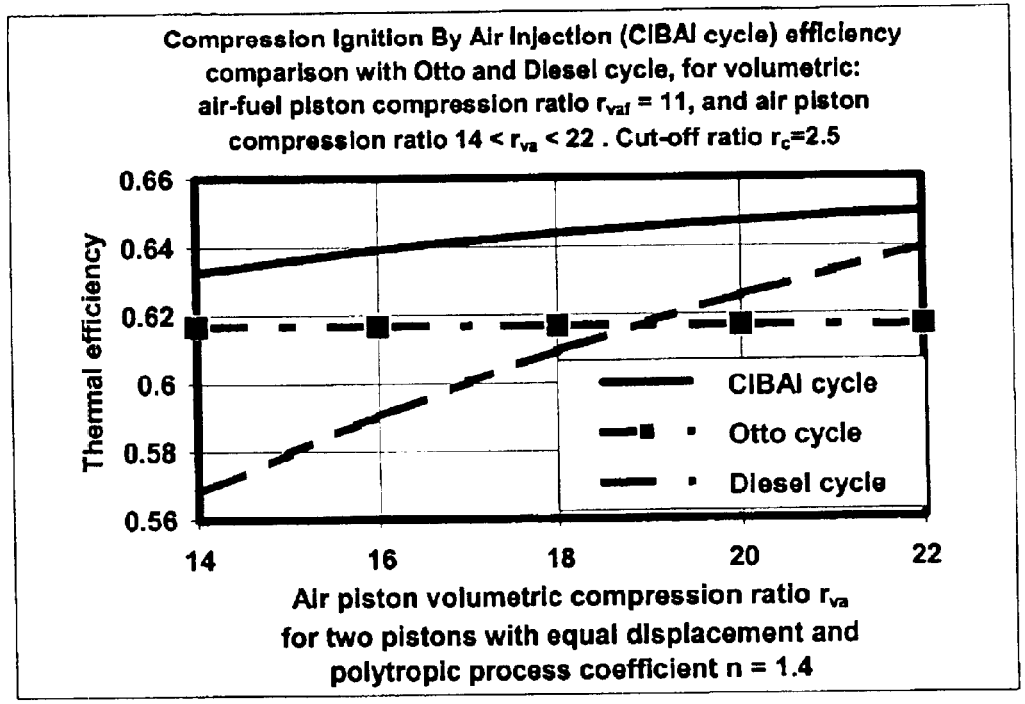
FIGS. 4a and 4b show a comparison of efficiencies between the ideal Otto, Diesel and CIBAI cycles, for different compression ratios as indicated using the equation shown in the summary of the invention.
Figure 4B:
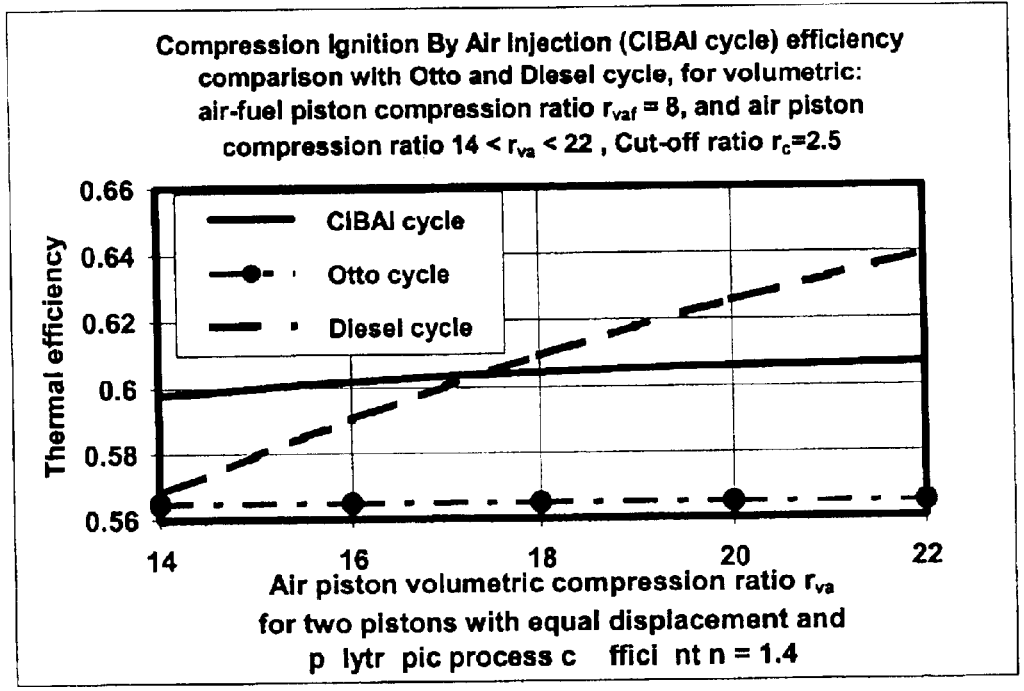

FIGS. 4a and 4b are graphs showing how the efficiency of these three ideal cycles compare with each other. All relevant variables have been kept the same for each cycle. All but one have been kept constant for easy comparison. They are:

1. Polytropic compression and expansion coefficient n=1.4
2. Air-fuel mixture piston volumetric compression ratio $$r_{vaf} = \frac{V_o + V_{2af}}{V_{2af}} = 11$$

3. Piston displacement volume ratio $V_o$ kept same for both pistons.
4. Combustion induced temperature ratio $T_3/T_2=r_c=2$, called cut-off ratio in diesel cycle. The efficiency of the Diesel and CIBAI cycle are shown as a function of air-only compression ratio $14<r_{vn}<22$. Of course Otto cycle efficiency depends only on the air-fuel mixture compression ratio set here at $r_{vaf}=11$. The CIBAI cycle efficiency is only higher than all others at high air-fuel mixture compression ratio as shown in FIG. 4a. At $r_{vaf}=8$ it is only better than Diesel up to a compression ratio $r_{va}=14$.

Figure 5A:
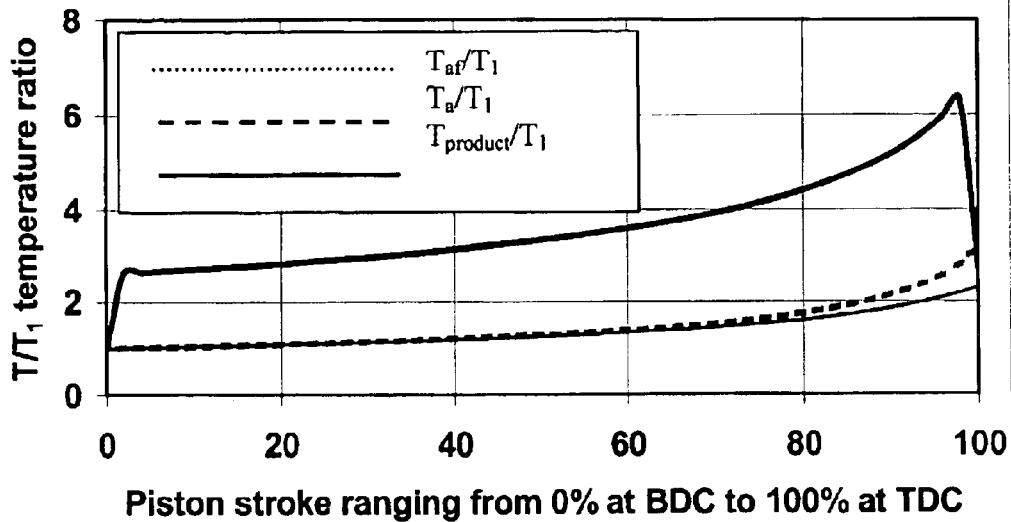
FIG. 5a shows typical ideal CIBAI cycle temperature changes in each cylinder for a 2-stroke engine during compression from station 1 to 2a and 2af, mixing of 2a and 2af to produce 2, combustion from 2 to 3 and expansion from 3 to 4, exhaust return from 4 back to 1.
Figure 5B:
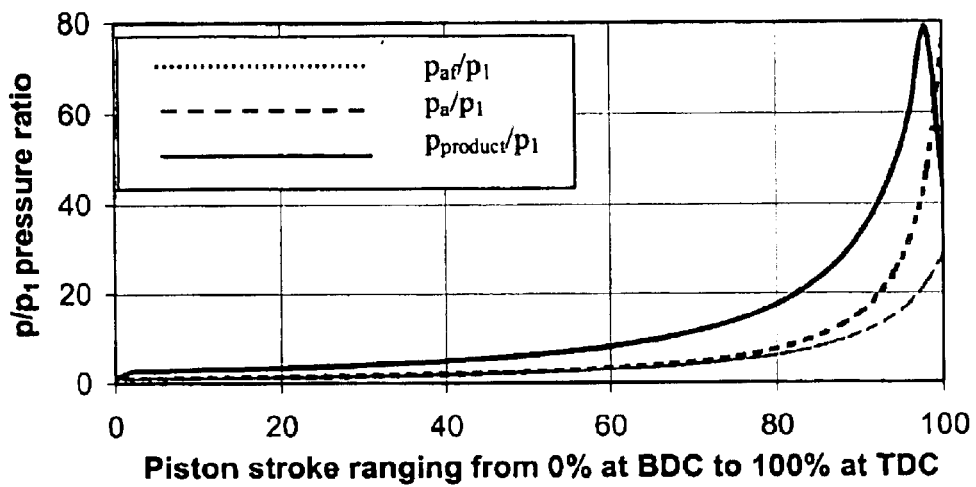
FIG. 5b shows typical ideal CIBAI cycle pressure changes in each cylinder for a 2-stroke engine during compression from station 1 to 2a and 2af, mixing of 2a and 2af to produce 2, combustion from 2 to 3 and expansion from 3 to 4, exhaust return from 4 back to 1.

FIGS. 5a and 5b are graphs showing how the dimensionless temperature and pressure vary throughout the ideal CIBAI cycle.

I claim:
1. A novel sequence of thermodynamic processes comprising:
   operating a closed internal combustion engine cycle which contains one or more pairs of cylinders with their heads in close proximity and pistons moving in phase and having a cylinder-connecting valve mounted in-between said cylinder heads, which is closed while one piston compresses an air-fuel mixture to a knock free level while the other piston compresses air to a substantially higher pressure, so that at the end of their compression stroke, when the cylinder-connecting valve is opened, the high-pressure air will compress, heat and ignite the air-fuel mixture resulting in constant volume heat addition at top dead center, to a substantially higher pressure and thus thermal efficiency than possible with a spark ignition Otto cycle, and also higher efficiency then with a Diesel cycle, while during the power/expansion stroke, the cylinder-connecting valve remains open to assure equal pressure acting on both pistons.

2. The method of claim 1 wherein said two pistons can have different stroke length and displacement volume as long as they arrive at close to the same time at the end of their compression and expansion strokes and the opening of the cylinder-connection valve near the end of the compression strokes does not significantly alter the compression volume in each cylinders.

3. The method of claim 1 wherein output power can be controlled by means of regulating the air-fuel mixture ratio in the cylinder compressing air and fuel, without need for a throttle valve.

4. The method of claim 1 wherein the internal combustion engine does not require spark ignition or ignition by high-pressure fuel injection.

5. The method of claim 1 wherein the internal combustion engine can operate efficiently on a wide range of fuels by modifying the compression ratio of the cylinder compressing the air-fuel mixture.

6. The method of claim 1 wherein the above thermodynamic cycle depends on five controlling parameters: air-fuel mixture compression ratio, air only compression ratio, combustion temperature ratio equivalent to the Diesel cycle cut-off ratio, one polytropic process exponent and the ratio in piston displacement volume between the cylinder compressing the air-fuel mixture and the cylinder compressing air.

7. The method of claim 1 wherein the thermodynamic cycle is defined by: compression ignition by air injection, capable of achieving higher thermal efficiency and eliminating spark ignition, high pressure fuel injection, a throttle valve, diesel engine cold starting problems and small scale limitations.

8. An internal combustion engine apparatus comprising of at least two cylinders with their heads in close proximity and separated during the compression stroke by a closed cylinder-connecting valve while their pistons moving in phase, reaching the end of their compression stroke simultaneously or nearly so, and one of said cylinders compressing an air-fuel mixture to a high but knock free level, while in the other cylinder compressing air to a substantially higher pressure, and opening said cylinder-connecting valve at or near end of the compression stroke to allow high pressure air to enter cylinder containing said air-fuel mixture and igniting same by compression heating for the purpose of achieving explosive near constant volume combustion followed by an expansion stroke with said cylinder-connecting valve open to assure equal pressure acting on both pistons and complete combustion of all fuel present.

9. The apparatus of claim 8 wherein the thermal efficiency exceeds that obtainable in a conventional engine as compression ignition by air injection can generate instantaneously a far greater pressure upon ignition of the air-fuel mixture then is possible without knock in a Otto cycle based engine.

10. The apparatus of claim 8 wherein the thermal efficiency exceeds that obtainable in a conventional diesel engine because the compression ratio in the air cylinder is not limited by the need for a finite combustion chamber volume as is in a diesel engine and igniting air fuel mixture results in constant volume heat addition which is more efficient than constant pressure heat addition as in a diesel engine with its finite fuel injection expansion ratio, called cut-off ratio.

11. The apparatus of claim 8 wherein each pair of piston-cylinders must be positioned with their cylinder heads in close proximity to one-another which can be achieved by mounting said cylinders either side-by-side, head-to-head inline or head-to-head in a V-formation.

12. The apparatus of claim 8 wherein at least one cylinder-connecting valve is used to keep the pair of cylinders isolated during the compression stroke and means to connect said two cylinders rapidly near or at the end of their compression stroke without increasing the sum-total of their two compression volumes and to remain open during at least the power expansion stroke and preferable during scavenging of the combustion products while actuating said valves by either mechanical, hydraulic, pneumatic or electric means as timed by the angular position of at least one of their crankshaft.

13. The apparatus of claim 8 wherein at least one cylinder-connecting valve is used to keep the pair of cylinders isolated during the compression stroke and means to connect said two cylinders rapidly near or at the end of their compression stroke without increase in the sum total of their two compression volumes and to remain open during at least the power expansion stroke and preferable during scavenging from combustion products while actuating said valves pneumatically by means of springs and pressure differences between the two cylinders or pressure in the crankcases in the case of a two-stroke engine.

14. The apparatus of claim 8 wherein the air-fuel mixture is in general rich, as it contains approximately only half the air available for combustion therefore, it can be ignited by high-pressure air injection over a wide range of air-fuel mixture ratios, like a stratified charge engine, thereby eliminating the need for a throttle valve and the need for spark plug or a glow plug ignition source and the diesel engine's problem with cold starting.

15. The apparatus of claim 8 wherein a pre-evaporated air fuel mixture is compression ignited by air injection and therefore can be operated without ignition by fuel injection as used in the diesel cycle and without a high-pressure fuel pump with individual cylinder injectors with their inability to meter small fuel quantities, thereby enabling the herein disclosed apparatus of claim 8 to scale down to very small engines as needed for portable engine powered equipment.

16. The apparatus of claim 8 wherein the internal combustion engine operates at high efficiency on liquid and gaseous fuels over a wide range of properties such as octane number, cetane number, lubricity thereby providing a suitable general aviation aircraft replacement engine and eliminate the currently used 100 Low Lead avgas.

17. The apparatus of claim 8 wherein the internal combustion engine operates at optimum efficiency on a wide range of fuels by automatically modifying mechanically, hydraulically, electrically or pneumatically the compression volume at top dead center on the cylinder(s) which compress the air-fuel mixture, based on sensing the occurrence of pre-ignition in any one of them.

18. The apparatus of claim 8 wherein with a two stroke engine one can scavenge exhaust products from both cylinders more thoroughly than is possible in a conventional engine by placing all exhaust ports at the base of the air-compressing cylinder and all inlet ports at the base of the air-fuel mixture compressing cylinder thereby assuring one-way flow of all exhaust products by first scavenging with the cylinder air charge followed by scavenging with the air-fuel mixture one can assure to prevent any unburned fuel from escaping through the exhaust ports.

* * * * *